Oct. 25, 1966 A. LARSSON 3,280,590
APPARATUS FOR COOLING OR HEATING MATERIAL ON A BAND CONVEYOR
Filed Jan. 9, 1964 3 Sheets-Sheet 3
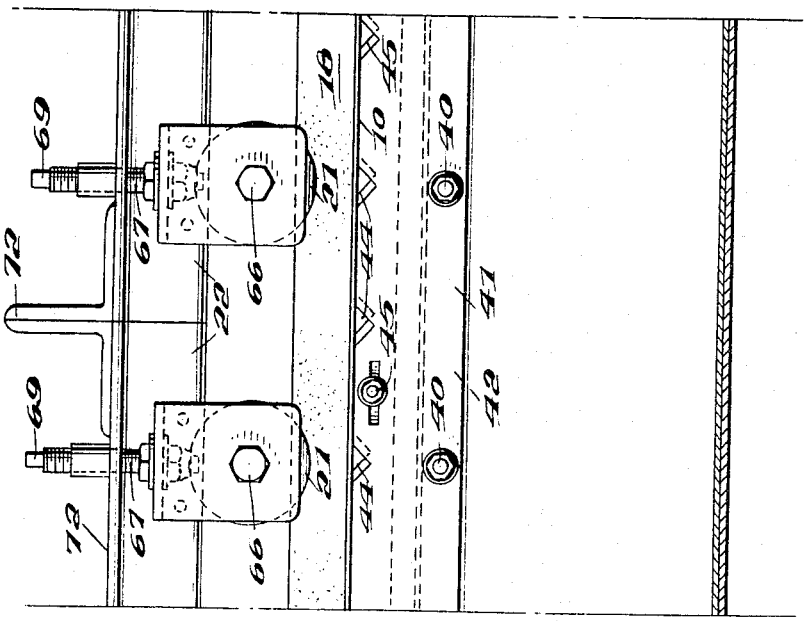
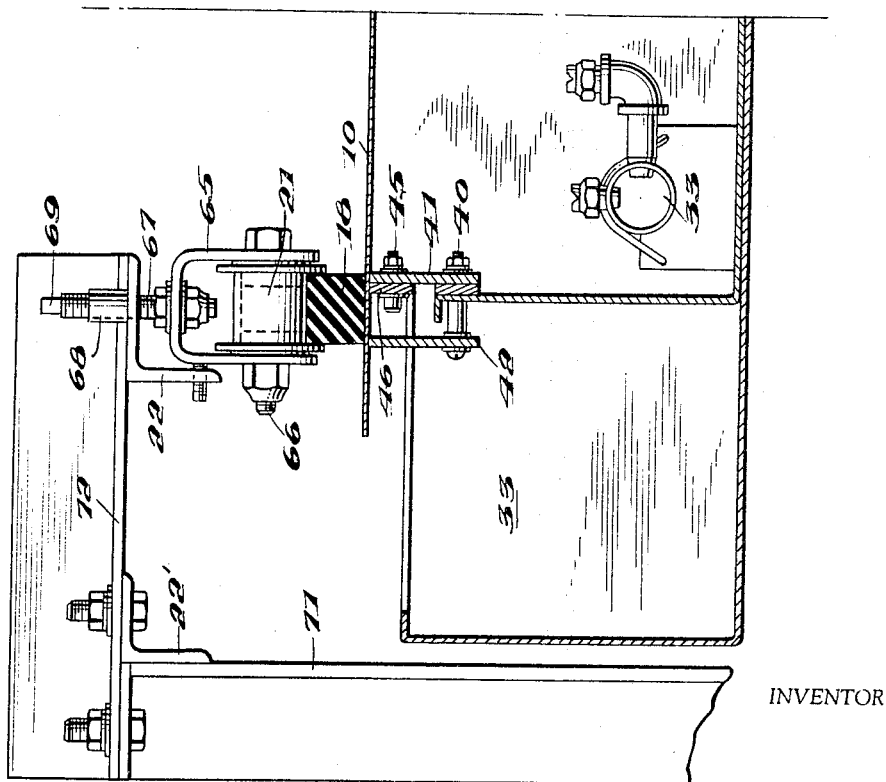
INVENTOR
Arve Larsson,
BY Pierce, Scheffler & Parker
his ATTORNEYS

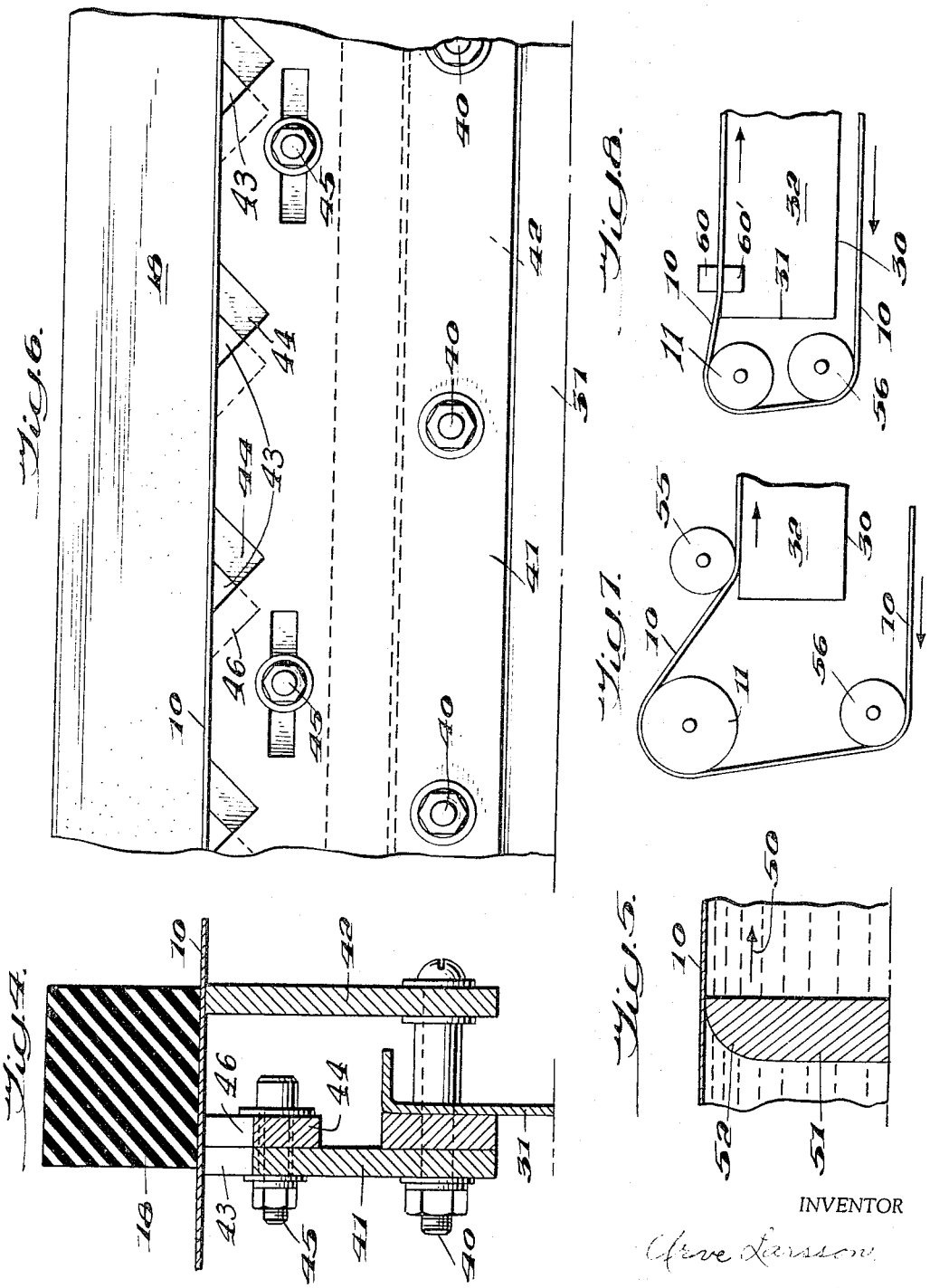

United States Patent Office 3,280,590
Patented Oct. 25, 1966

3,280,590
APPARATUS FOR COOLING OR HEATING MATERIAL ON A BAND CONVEYOR
Arve Larsson, Emerson, N.J., assignor to Sandvikens Jernverks Aktiebolag, Sandviken, Sweden, a corporation of Sweden
Filed Jan. 9, 1964, Ser. No. 336,664
8 Claims. (Cl. 62—380)

This invention relates to the art of transferring heat from, or to, a liquid or readily liquefiable material carried upon a band conveyor, and is particularly concerned with an improved apparatus of the general type wherein the upper flight of an endless conveyor belt "floats," or is supported, on the upper surface of a body of heat-exchange liquid maintained in an open-topped elongated tank, upon the upper surface of such portion of the conveyor belt a liquid material is delivered for solidification by freezing (or, optionally, for subjection to melting by heating). In the following the invention will be described with particular reference to use of the apparatus in freezing a liquid to be processed, which liquid will be called the "process liquid."

Apparatus of the general type just described are disclosed in U.S. Patents Nos. 2,844,359, K. B. Annerhed, and 2,437,492, W. H. Allen, and in the following disclosure the present invention will be more specifically seen to constitute improvements to said Allen apparatus.

A practical limitation to the capacity of the Allen apparatus arises from the transverse flatness of the surface of the conveyor belt making it possible to retain thereon without sidewise spilling only a relatively very thin layer of the process liquid. It would very significantly improve the capacity of the apparatus were it possible to handle a thicker layer of the liquid undergoing processing. Longitudinal troughing of the upper flight of the conveyor belt theoretically should improve the throughput of the apparatus, but has been found to be a virtual impossibility in actual practice. But were it possible, it would provide a solidified "slab" having an undesirable variation in thickness from one edge to the other making for a highly undesirable nonuniformity in an ensuing vaporization of liquid (water) from the frozen product.

An object of the present invention is to provide—to an apparatus of the general type of the aforesaid Allen apparatus—means whereby thicker, yet uniform, layers of a process liquid can be retained on the upper surface of the upper flight of the conveyor belt without spillage of the process liquid over the sides (edges) of the belt.

Another inventive object is to provide means for positive regulation of the overflow of heat-exchange liquid along the side edges of the tank beneath the upper flight of the conveyor belt.

These, and other, inventive objects have been realized through the improved apparatus of the present invention. In its broadest aspect, the apparatus of the invention is characterized by the combination of a novel structure of the upper portions of the sidewalls of the tank with a novel traveling curbing or confining means physically separate from the conveyor belt but provided along the upper sides of the dges of the upper flight of the conveyor belt, making possible the retention on said belt of a thicker layer of the process liquid than otherwise would be possible and without the necessity for longitudinal troughing of the upper flight of the conveyor belt. Said confining or curbing means may and preferably does take the form of a pair of endless edge belts disposed above and on either side of the upper flight of said conveyor belt and trained about sheave means whose axes are substantially perpendicular to the plane of the upper flight of the conveyor belt, the edge belts being so arranged with respect to said conveyor belt that one flight of each of said edge belts overlies a substantial portion, or all, of one edge of the upper flight of said conveyor belt and it adapted to be pressed, by means to be described hereinbelow, relatively tightly into contact with the belt surface which it overlaps. The edge belts may be and preferably are driven at substantially the same speed as that of the conveyor belt and their overlying flights are driven in the same direction as that of said conveyor belt whereby the edge belts provide raised margins along the edges of the upper flight of the conveyor belt to restrain against sidewise spillage a substantial layer of the process liquid.

To receive the pressure exerted by the edge belts upon the edges of the conveyor belt the upper portions of the sidewalls of the tank, traversed by the upper flight of the conveyor belt, are provided with a unique structure which while insuring the controlled overflow of heat-exchange liquid over the sides of the tank (in full heat-exchanging contact with the underside of the upper flight of the conveyor belt) positively supports the upper flight of the conveyor belt against undesirable lateral deformation or warping.

The invention will now be described in detail and with reference to the accompanying drawings, in which FIG. 1 is a side elevational view of a conveyor embodying principles of the present invention;

FIG. 4 is a detail of the edge of the conveyor belt and its supporting structure;

FIG. 5 is a detail of a tightening edge at a transversal wall;

FIG. 6 is a detail of the device shown in FIG. 4;

FIG. 7 is a schematic representation of one operable form of end margin for the conveyor belt;

FIG. 8 is a schematic representation of another form of end margin;

FIG. 9 is a fragmentary end elevational view, in detail, of an alternative means for pressing the edge belts into liquid-confining contact with the conveyor belt; and FIG. 10 is a side elevation of FIG. 9.

Figure 1:
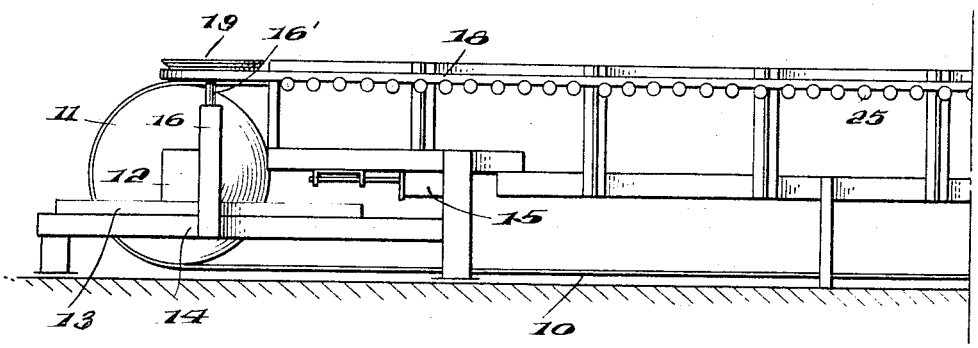
Figure 2:
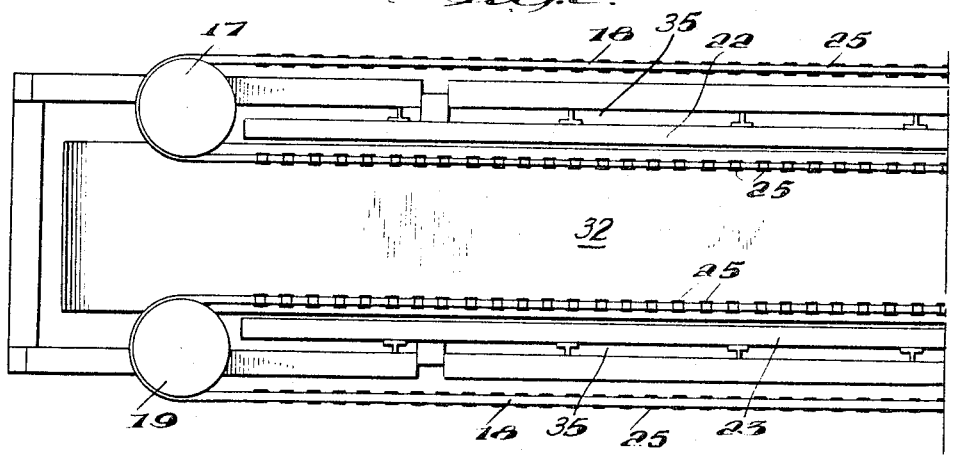
FIG. 2 is a top elevational view of the conveyor shown in FIG. 1.

In FIG. 1 is shown an endless conveyor belt 10 carried by a supporting structure comprising two similar end pulleys, one of which is shown in the drawing at 11. The belt is preferably made of steel. End pulley 11 is rotatably supported in bearings 12 on supports 13 which are slidable on girders 14. The supports 13 are connected to a spring device 15 holding end pulley 11 under tension, so that the conveyor is properly stretched. To the girders 14 are fastened struts 16, each strut carrying a vertical shaft 16' at its upper end. This shaft 16' carries a sheave 17 supporting a flexible edge belt 18 having square cross-section. The belt 18 is endless, and is supported at the other end of the conveyor by a sheave (not shown). The part of the edge belt 18 that is situated adjacent the conveyor is held in contact with the top surface of the conveyor, thereby forming an upstanding edge or "curbing" or margin to the conveyor. At the other side of the conveyor there is another similar edge belt 20 supported by a sheave 19. The conveyor belt and the edge belts thereby together form a trough section in which a body of liquid of substantial depth can be contained.

In order to maintain a tight contact between the conveyor belt and the edge belt pressure idlers 21 are provided along the edge belt on top thereof. The pressure idlers are carried on stub shafts 21' fastened along longitudinal girders 22 and 23. The return flight of the edge belt is carried on idlers 25.

Figure 3:
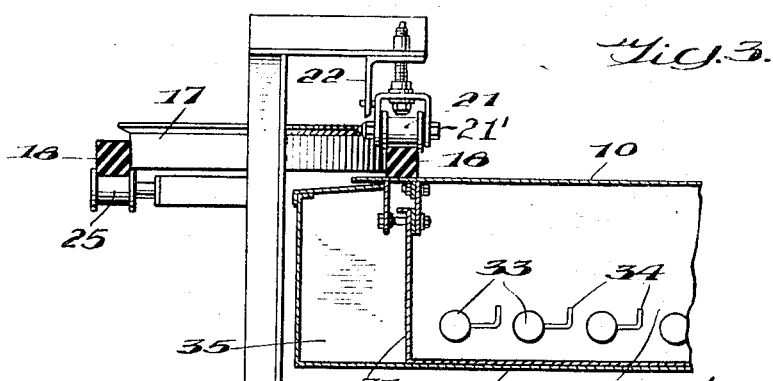
FIG. 3 is a partial cross-sectional view, on a larger scale, of the conveyor shown in FIGS. 1 and 2 taken on the line 3—3 in FIG. 2.

Below the upper flight of conveyor belt 10 there is disposed a fluid tank 30. The tank is divided by longitudinal walls 31 on each side, one of which is shown in FIG. 3, into a wider, longitudinally central tank part 32 and, on either side thereof, a narrower outer chamber 35, 35. The central part 32 of the tank is filled with a heat-exchange fluid (i.e., liquid coolant) supplied by tubes 33 having upwardly directed nozzles 34. The fluid is supplied under pressure, and is urged to overflow between the belt 10 and the top of the wall 31 into the outer chambers 35, 35 of the tank, from which outer chambers it is circulated back into the central part 32, through the tubes 33, by the aid of a suitable pump (not shown). During this circulation the fluid is cooled by a suitable refrigerating system (not shown) to the desired temperature.

The top edge of each wall 31 is provided with means for supporting the conveyor belt 10 and means for regulating the flow of liquid from the tank 32. These means are shown in detail in FIGS. 4 and 6. Bolts 40 hold metal or plastic plates 41 and 42 extending upwardly from the wall 31. These plates form at their upper surfaces a support for conveyor belt 10, receiving the pressure from the edge belt 18 caused by the idlers 21. The upper surface of the plates is or should be smooth in order to promote as smooth sliding as possible of the conveyor belt along the plates. The top surface of plate 42 is uninterrupted, but the top surface of plate 41 is provided with spaced triangular notch openings 43 allowing the liquid from the central part 32 of the tank to flow through said notches. In order to regulate the size of the openings 43 there is provided a bar 44 secured to the plate 41 by screws 45. The bar 44 has triangular notches 46 similar to and spaced at the same intervals as the notches 43. The screws 45 pass through longitudinal slots 47 provided in the plate 41, so that the bar 44 can be longitudinally moved in relation to the plate 41. The notch openings 43 and 46 can then be adjusted in relation to each other and with regard to that heat-exchange liquid in such a way that the resulting openings assume the desired size, thereby regulating the flow of liquid through the openings. It would be possible to omit plate 42 and to place the notched edge 41 centrally below the curbing belt 18 (FIG. 4), but such modification would have the serious disadvantage that the liquid exiting through the notches would form jets spurting forth into the surrounding room. The plates 42 deflect these jets and, at the same time, provide an auxiliary support together with the plate 41 for carrying the conveyor belt.

In FIG. 5 is shown the top of a transversal wall of the fluid tank. The conveyor belt 10 travels in the direction marked by the arrow 50, and the wall 51 is beveled at its top by a rounded portion 52 at the rear of the wall. Such transversal walls are provided at both ends of the fluid tank, but there can also be a number of intermediary transversal walls shaped in the same way in order to prevent the heat-exchange liquid from moving along with the belt, thereby decreasing the cooling (or, heating) effect.

As heat-exchange, e.g., refrigerant, calcium chloride brine has been found suitable, but any other heat-exchange liquid such as glycol solution can be used. It is important that the openings 43, 46 are regulated with regard to the viscosity of the heat-exchange liquid, so that the desired cooling (or, heating) rate is obtained. This regulating possibility also provides an opportunity to regulate the flow with regard to the varying viscosity of a refrigerant at different temperatures.

The edge belts should be made of a flexible material as for instance rubber. In the embodiment shown, the edge belt is not bonded to the conveyor belt but is carried by a supporting mechanism of its own. This has a substantial advantage in connection with the purpose of the invention to freeze a liquid. It is well known that a liquid which freezes in contact with a solid object often very strongly adheres to this object. In the present case the frozen product adheres not only to the conveyor belt but also to the edge belts. As explained above the ice sheet is removed from the belt when the belt bends around the end sheave. If the side belt then were bonded to the conveyor belt there would arise a substantial shear force between the ice and the edge belt before the ice were removed, and the bonding between the conveyor belt and the edge belt would be subjected to substantial stresses. By the presently described device the edge belt is bent sidewardly by the sheaves and pulled away from the ice by a force perpendicular to the contact surface and affecting a very small area of said surface, which implies a comparatively small force on the belt.

With the new design it is thus possible to pour a layer, of substantial thickness, of process liquid onto the belt, retain it by the traveling edge belts and secure continuous freezing as the conveyor belt passes over the body of coolant in the cooling tank. The product, when frozen, leaves the conveyor belt as the latter bends around the end pulley, so that it can come off as a continuous sheet, which latter may then be further processed by any desired conventional method.

A great advantage of freezing by this method is that the ice crystals in the product start forming against the surface of the conveyor belt and there is a vertical orientation of the ice crystals which enhances the rate at which the ice crystals turn to vapor during an ensuing vacuum drying process. Another advantage is that the entire conveyor does not have to be housed in a cold room. With the belt as the freezing surface, an initially liquid product can be frozen solid without the need of blast freezing tunnels, making the entire conveyor accessible to maintenance and repair and operating personnel.

To prevent—or, minimize—run-off of process liquid at the delivery end of the conveyor belt, end pulley 11 may, as illustrated in FIG. 7, be so located that conveyor belt 10 leaves the pulley at a level slightly higher (e.g., say, one inch higher) than the top of tank 30, and then is sloped downwardly to an idler pulley 55 which delivers the belt 10 at the level of the top of the tank. By this means the backward flow of liquid on belt 10 is prevented. In the alternative shown in FIG. 8, such backward flow of process liquid may be minimized or prevented by the provision of a dam means 60 disposed transversely of belt 10 adjacent the delivery end of the upper flight of the belt, which dam means may be pressed—by conventional means—in substantially liquid-tight contact against the belt 10. The belt may be backstopped at this point by a transverse supporting member 60' against which the belt may be pressed by dam means 60. In the embodiments shown in FIGS. 7 and 8, the belt 10 is shown as being trained over idler pulleys 56 so positioned as to carry the belt into engagement with end pulley 11.

A peculiarly advantageous embodiment of the invention is illustrated in FIGS. 9 and 10. According to this embodiment each edge belt 18 is pressed into liquid-tight engagement with conveyor belt 10 by means of an array of individually adjustable edge-belt holddown roller assemblies each consisting of an inverted "U" yoke member 65 between the arms of which member 21 is rotatably supported on axle 66. Yoke member 65 is suspended from the horizontal girder 22 by a threaded shaft 67 which passes through an internally threaded sleeve 68 secured to girder 22, and its vertical position is adjustable by applying a wrench to the upper end 69 of the shaft. Girder 22 is supported on vertical support columns 71 by a plurality of horizontal arms 72 to which latter girder 22 is secured.

It will be appreciated by those skilled in this art that the apparatus members which can come into contact with liquid should be formed of a metal which is not adversely affected by the liquid. In cases where the "process liquid" is water or an aqueous liquid I prefer to form the members of stainless steel.

As mentioned herein above, the invention is characterized by impressing a predetermined condition on the underside of a metal conveyor belt whereby to freeze a congealable liquid or to solidify a thixatropic material or to heat an initially solid material.

I claim:

1. Apparatus for cooling a liquid material on a generally horizontal upper flight of a traveling endless metal conveyor belt, which comprises an elongated, open-topped tank having opposed generally vertical sidewalls and extending longitudinally beneath the underside of the upper flight of said conveyor belt, on the upper surface of the upper flight of which conveyor belt the liquid material to be cooled is to be deposited;

inlet means within said tank for introducing into said tank a liquid coolant under pressure;

extension members adjustably secured along the upper portions of said sidewalls and adapted to be positioned with their upper edges in contact with the underside of the upper flight of said conveyor belt forming backstopping means for said upper flight;

spaced notches along the upper edges of said extension members through which liquid coolant may overflow from a body of such liquid coolant occupying said tank;

means adjustably secured to said extension members for adjusting the effective sizes of said notches;

traveling curbing means along the upper sides of the edges of the upper flight of said conveyor belt, said curbing means being in substantial alignment with the upper edges of said extension members; and means for sealingly pressing said curbing means against said conveyor belt.

2. Apparatus as defined in claim 1, in which said traveling curbing means consist essentially in a pair of resilient endless bands above and on either side of the upper flight of said conveyor belt, and in which the means for pressing each of said bands against the conveyor belt comprises a plurality of spaced pressure idler rollers depending from generally horizontal supporting girder members, which pressure idler rollers are individually vertically adjustable.

3. Apparatus as defined in claim 2, in which each of said spaced pressure idler rollers is individually mounted in a yoke member which is individually vertically adjustable.

4. Apparatus as defined in claim 1, in which transversal walls are positioned within said tank beneath and in contacting relation to the underside of the upper flight of said conveyor belt.

5. Apparatus for cooling a liquid material on a generally horizontal upper flight of a traveling endless metal conveyor belt, which comprises an elongated, open-topped tank extending longitudinally beneath the underside of the upper flight of said conveyor belt upon the upper surface of which the liquid material to be cooled is to be deposited, said tank including opposed generally vertical sidewall members in contact with the underside of the upper flight of said conveyor belt forming backstopping means for said upper flight;

inlet means within said tank for introducing into said tank a liquid coolant under pressure;

spaced notches along the upper edges of said sidewall members through which liquid coolant may overflow from a body of such liquid coolant occupying said tank; and traveling curbing means along the upper sides of the edges of the upper flight of said conveyor belt.

6. Apparatus as defined in claim 5, including means adjustably secured to said sidewall members for adjusting the effective sizes of said notches.

7. Apparatus as defined in claim 6, including means for sealingly pressing said curbing means against said conveyor belt.

8. Apparatus as defined in claim 7, wherein the upper edges of said notched sidewall members constitute a first support means beneath and supporting the edges of the upper flight of the conveyor belt, said apparatus being further provided with a second supporting means disposed beneath the edges of the upper flight of the conveyor belt and exteriorly of said tank and of said notched sidewall members and outwardly spaced from the latter, the upper edge surfaces of said second supporting means being substantially uninterrupted and at substantially the same level as the level of the notched sidewall members.

References Cited by the Examiner

UNITED STATES PATENTS

| | | | |
|---|---|---|---|
| 2,437,492 | 3/1948 | Allen | 165—86 |
| 2,479,871 | 8/1949 | Scriven | 62—380 X |
| 2,637,064 | 5/1953 | Miller | 100—154 X |
| 2,808,236 | 10/1957 | Dickinson | 165—86 X |
| 2,844,359 | 7/1958 | Annerhed | 165—86 |
| 2,986,083 | 5/1961 | Copeland et al. | 100—154 |

ROBERT A. O'LEARY, *Primary Examiner.*

W. E. WAYNER, *Assistant Examiner.*